(12) United States Patent
Benkö et al.

(10) Patent No.: US 11,198,533 B2
(45) Date of Patent: Dec. 14, 2021

(54) PACKAGING MATERIAL AND A METHOD FOR PROVIDING A PACKAGING MATERIAL

(71) Applicant: Tetra Laval Holdings & Finance S.A., Pully (CH)

(72) Inventors: Gabor Benkö, Lund (SE); Anders K. Gustafsson, Perstorp (SE); Paul Trägårdh, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/484,795

(22) PCT Filed: Jan. 22, 2018

(86) PCT No.: PCT/EP2018/051380
§ 371 (c)(1),
(2) Date: Aug. 8, 2019

(87) PCT Pub. No.: WO2018/145881
PCT Pub. Date: Aug. 16, 2018

(65) Prior Publication Data
US 2019/0359369 A1 Nov. 28, 2019

(30) Foreign Application Priority Data
Feb. 8, 2017 (EP) .................................. 17155277

(51) Int. Cl.
*B65D 5/06* (2006.01)
*B31B 50/74* (2017.01)
(Continued)

(52) U.S. Cl.
CPC ............ *B65D 5/064* (2013.01); *B31B 50/745* (2017.08); *B31B 50/84* (2017.08); *B32B 15/08* (2013.01);
(Continued)

(58) Field of Classification Search
CPC .......... B65D 5/64; B65D 5/443; B65D 65/40; B65D 2231/02; B65D 2231/022;
(Continued)

(56) References Cited

U.S. PATENT DOCUMENTS 3,120,335 A    2/1964   Egleston
3,178,091 A    4/1965   Tobias
(Continued)

FOREIGN PATENT DOCUMENTS

DE   7518956   11/1975
DE   3446323   6/1986
(Continued)

OTHER PUBLICATIONS

International Search Report and Written Opinion of PCT/EP2018/051380, dated Apr. 19, 2018 in 12 pages.

*Primary Examiner* — Christopher R Demeree
(74) *Attorney, Agent, or Firm* — Knobbe, Martens, Olson & Bear, LLP

(57) ABSTRACT

A packaging material, including a laminate with a core material layer and having a plurality of delimited areas intended to form faces of a package is provided. At least one delimited area is provided with at least one pre-laminated hole and at least one compressed feature arranged adjacent to the pre-laminated hole. The at least one feature may include at least one line extending along at least a part of the perimeter of the pre-laminated hole.

17 Claims, 6 Drawing Sheets

(51) Int. Cl.
    *B31B 50/84*     (2017.01)
    *B32B 15/08*     (2006.01)
    *B32B 15/20*     (2006.01)
    *B32B 27/10*     (2006.01)
    *B65D 5/44*     (2006.01)
    *B65D 65/40*     (2006.01)
    *B31B 105/00*     (2017.01)

(52) U.S. Cl.
    CPC .............. *B32B 15/20* (2013.01); *B32B 27/10* (2013.01); *B65D 5/443* (2013.01); *B65D 65/40* (2013.01); *B31B 2105/001* (2017.08); *B32B 2307/75* (2013.01); *B32B 2439/62* (2013.01); *B65D 2231/022* (2013.01)

(58) Field of Classification Search
    CPC .. B65D 5/563; B65D 75/5894; B31B 50/745; B31B 50/84; B32B 15/08; B32B 15/20; B32B 27/10
    USPC ............ 229/5.81, 103.1, 206; 220/229, 705; 383/302; 493/110
    See application file for complete search history.

(56) References Cited

U.S. PATENT DOCUMENTS

| | | | |
|---|---|---|---|
| 3,270,940 A | 9/1966 | Egleston | |
| 3,361,611 A * | 1/1968 | Stark | B32B 27/00 156/252 |
| 4,266,993 A * | 5/1981 | Olsen | B29C 65/08 156/69 |
| 4,518,377 A | 5/1985 | Skinner | |
| 4,582,246 A | 4/1986 | Lisiecki | |
| 4,585,498 A * | 4/1986 | Lagerstedt | B29C 65/78 156/69 |
| 4,591,091 A * | 5/1986 | Wise | B65D 5/065 229/103.1 |
| 4,705,197 A * | 11/1987 | Gordon | B65D 5/708 229/123.3 |
| 4,798,295 A * | 1/1989 | Rausing | B65D 5/065 229/229 |
| 4,798,296 A * | 1/1989 | Lagerstedt | B65D 5/065 220/270 |
| 4,815,655 A * | 3/1989 | Jacobsson | B65D 5/065 229/123.2 |
| 4,860,902 A | 8/1989 | Kieser | |
| 5,054,684 A | 10/1991 | Faerber | |
| 5,147,065 A * | 9/1992 | Rush | B65D 47/36 215/229 |
| 5,348,217 A * | 9/1994 | Bettle, Jr. | B65D 5/70 215/388 |
| 5,620,550 A * | 4/1997 | Andersson | B65D 5/708 156/252 |
| 6,766,941 B1 * | 7/2004 | Tokarski | B65D 5/065 229/235 |
| D592,052 S * | 5/2009 | Martini | D9/433 |
| 7,556,191 B2 * | 7/2009 | Hewitt | B65D 77/28 229/103.1 |
| 2005/0258222 A1* | 11/2005 | Hewitt | B31B 50/88 229/103.1 |

FOREIGN PATENT DOCUMENTS

| | | | | |
|---|---|---|---|---|
| GB | 1545738 | | 5/1979 | |
| GB | 1545738 A | * | 5/1979 | ............. B65D 5/708 |
| JP | H08324563 | | 12/1996 | |
| JP | 2012192966 | | 10/2012 | |
| JP | 2012192966 A | * | 10/2012 | |
| JP | 5953651 | | 7/2016 | |

\* cited by examiner

PACKAGING MATERIAL AND A METHOD FOR PROVIDING A PACKAGING MATERIAL

TECHNICAL FIELD

The present solution relates to a packaging material, in particular to a packaging material being provided with at least one pre-laminated hole. The present solution also relates to a method for providing such packaging material, as well as a package being formed by the packaging material.

BACKGROUND ART

It is commonly known to use a paperboard based packaging material to form product containers, such as containers for enclosing and storing liquid food.

In order to ensure the required quality of the final package, e.g. in terms of food safety and integrity, the packaging material may comprise different layers. As an example, a packaging material may comprise a core layer of paper or paperboard with at least one polymeric composition or layer applied on one side thereof making up the outer surface of the final package, and a polymeric composition or layer on the opposite or inner side. The polymeric composition on the inner side may in some cases be provided with a protective film such as aluminum; the polymeric composition thus normally also includes an outer layer being in contact with the product intended to be contained in the final package. Usually, an additional polymeric composition is applied to the protective film in order to avoid direct contact between the foodstuff contained in the package and the protective layer itself in order to prevent the foodstuff from wetting the aluminium and other layers in the laminate.

Product containers formed by the above-mentioned packaging material may be provided with a pre-laminated hole, e.g. in order to facilitate the use of a straw which upon use is inserted into the package via the pre-laminated hole. At the hole, the core layer is missing such that only the outer and inner polymeric layers which optionally may including the protective film sandwiched between them, are covering the hole.

During manufacturing of such packaging material the core layer is processed by punching holes in it, and thereafter lamination in one or more steps is performed. This process is commonly known as "converting".

Forming and filling of the individual product containers or packages is performed by the use of a filling machine, which typically includes a plurality of consecutive process stations. For example, the filling machine may have an infeed station for receiving a web of packaging material, a sterilization station for sterilizing the web of packaging material, a tube forming station in which the web is continuously formed into a tube by sealing the lateral edges of the web, a filling station for filling the tube with a product, a sealing station for providing transversal seals to the tube and for cutting sealed packages from the upstream tube, and a final folding station for shaping the package into its final shape.

Another example of a filling machine uses pre-made blanks to form individual packages.

The pre-laminated hole is normally arranged on the upper portion of the final package, located at an area extending between one edge of the upper end and the upper transversal seal. As the pre-laminated hole introduces a local weakness of the packaging material there is a risk that the upper portion of the package will wrinkle undesirably in the vicinity of the pre-laminated hole. Any wrinkle will occur during sealing and/or final forming of the package which means that there are very limited possibilities to adjust or fine tune the operation of these filling machine stations during production, especially since the production speed of the filling machine is very high.

SUMMARY

The present solution aims at least partly overcoming one or more of the above-identified limitations of the prior art. In particular, it aims at reducing the formation of wrinkles near the pre-laminated hole of a packaging material during sealing and/or forming of the package.

One aspect of the present solution is a packaging material comprising a laminate with a core material layer and the packaging material has a plurality of delimited areas intended to form faces of a package. At least one delimited area is provided with at least one pre-laminated hole and at least one compressed feature arranged adjacent to the pre-laminated hole. The at least one feature comprises at least one line extending along at least a part of the perimeter of the pre-laminated hole.

The delimited area may be intended to form an upper end of the package. Preferably the pre-laminated hole is intended to form a straw hole of the package, whereby the straw hole is positioned at an area easily accessible for a customer.

The at least one compressed feature may be arranged within 10 mm from the pre-laminated hole, such as within 0-6 mm. Tests have shown that such distance between the pre-laminated hole and the compressed feature greatly reduces the formation of wrinkles in the final package.

The at least one compressed feature may be formed by embossing, debossing, or compression.

Referring to the at least one line above, it may be straight, and two straight lines may extend on opposite sides of the pre-laminated hole.

The at least one line may be curved, and two curved lines may extend on opposite sides of the pre-laminated hole.

Each curved line may extend between 30° and 150° of the periphery of the pre-laminated hole.

The curved line may form a circular line extending along the entire periphery of the pre-laminated hole.

The at least one feature may comprise at least one line extending from the periphery of the pre-laminated hole and radially away from the pre-laminated hole.

According to a second aspect, a package is provided. The package comprises a packaging material according to the first aspect, wherein the packaging material is closed by seals to form a closed package.

According to a third aspect a method for providing a packaging material is provided. The method comprises: provide a core material layer with at least one hole, laminate the core material layer in order to form a laminated packaging material with a pre-laminated hole, and provide at least one compressed feature adjacent to the pre-laminated hole prior to or after the core material layer is provided with at least one hole. The at least one feature comprises at least one line extending along at least a part of the perimeter of the pre-laminated hole.

Still other objectives, features, aspects and advantages of the present solution will appear from the following detailed description as well as from the drawings.

BRIEF DESCRIPTION OF THE DRAWINGS

Embodiments of the present solution will now be described, by way of example, with reference to the accompanying schematic drawings, in which.

DETAILED DESCRIPTION

Figure 1:
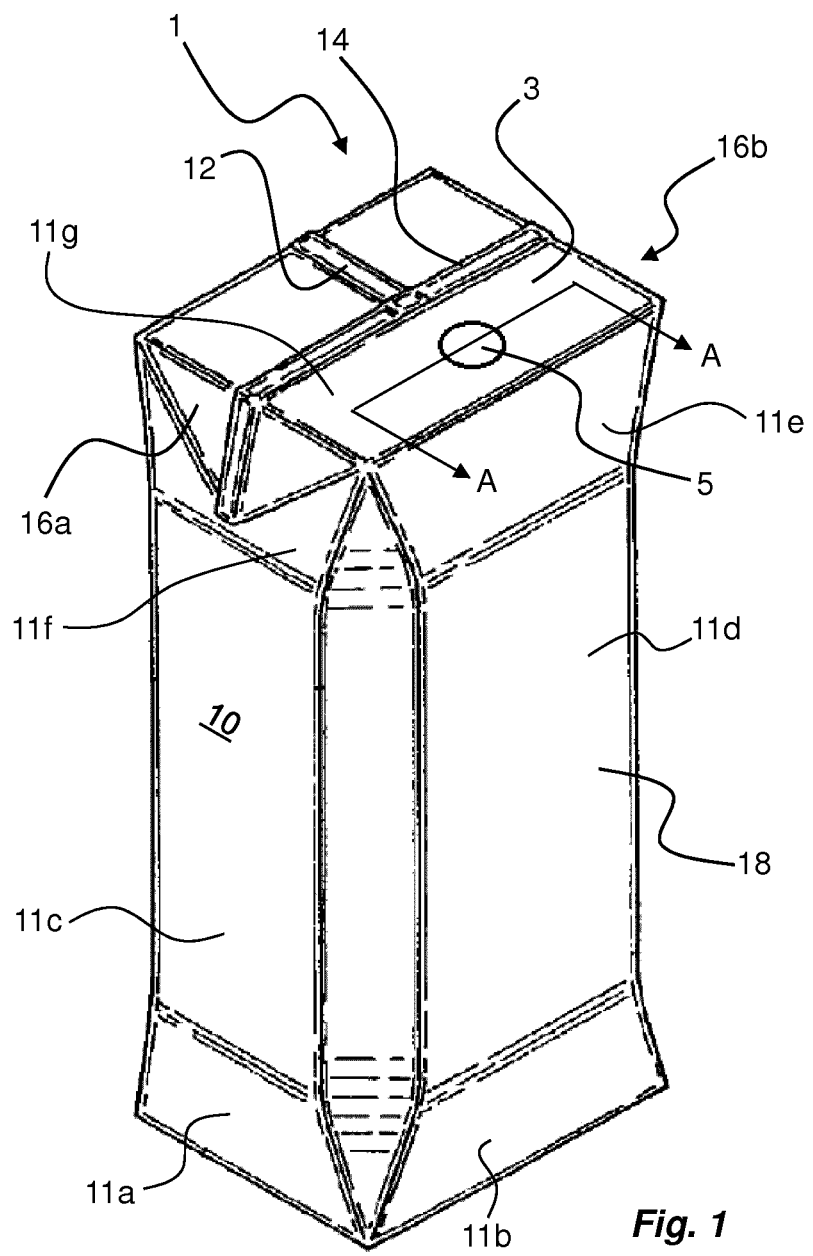
FIG. 1 is an isometric view of a package.

With reference to FIG. 1 an example of a package 1 is illustrated. The package 1 represent a commercially available liquid food package called Tetra Prisma®. As can be seen in FIG. 1, the package 1 comprises a relatively flat upper end 3 being provided with a straw hole 5. The straw hole 5, as will be explained later, is formed by a pre-laminated hole of the packaging material 10 used for producing the package 1.

The upper end 3 represents one of a plurality of delimited areas 11a-f of the packaging material 10. Each delimited area 11a-f is intended to form a face of the package 1 produced by the packaging material 10. It should be understood that not all delimited areas 11a-f are indicated in FIG. 1, and each area 11a-f may be delimited from adjacent areas 11a-f e.g. by means of crease lines.

The package 1 is formed from a web of packaging material 10, which is formed into a tube by sealing the longitudinal edges of the packaging material 10 to each other. The longitudinal sealing 12 can be seen in FIG. 1 as extending along the upper end 3, but as is evident the longitudinal sealing 12 runs along the entire package 1. When the tube is filled with its intended content the package 1 is sealed and cut from the tube by providing top and bottom transversal seals. In FIG. 1, only the top transversal seal 14 is shown. For final forming two upper flaps 16a, 16b are folded and attached to a main body 18 of the package 1. Although not shown, the final shape of the bottom end is achieved in a similar manner although the flaps are folded inwards. The final forming of the package 1 is preferably made by utilizing the crease lines.

Figure 2:
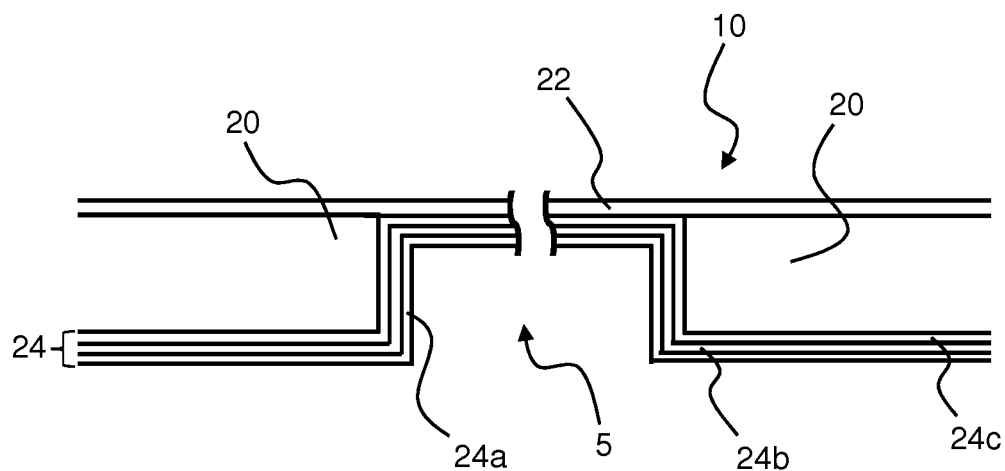
FIG. 2 is a cross-sectional view of a packaging material.

In FIG. 2 the packaging material 10 used for producing the package 1 is shown in further details. The cross-section is taken along line A-A in FIG. 1.

The packaging material 10 comprises a core material layer 20, an outer layer 22, and an inner layer 24, wherein the outer layer 22 and inner layers 24 are applied to opposite sides of the core material layer 20 after the at least one hole is cut. Hence, the core material layer 20 is provided with holes prior to converting, i.e. before one or more lamination process are performed in order to produce the final packaging material 10. The holes, which may be formed in a sequential pattern onto a web of the core layer, or individually on separate blanks, are preferably punched.

The outer layer 22 applied to one side of the core material layer 20 is adapted to provide the outer surface of the package 1 to be produced, which outer surface and outer layer 22 faces the surroundings of the package. The inner layer 24 is applied to the other side of the core material layer 20 and is adapted to provide the inner surface of the package 1 to be produced which is in contact with the product contained in the package 1.

The core material 20 may be a sheet for providing rigidity to the packaging material 10, and may preferably be made of material such as paper board or cardboard.

The outer layer 22 may comprise at least one layer of polymer material, which is applied to the core material layer 20 in a lamination process. Moreover, one of the layers making up the outer layer 22 may be a decorative layer making up the outer surface of the package 1 to be formed.

A printing layer may be included onto the core material layer 20, adjacent to the outer layer 22.

The inner layer 24 may comprise at least one layer of polymer material. As is shown in FIG. 2 a first and inner layer 24a is provided facing the product to be enclosed by the package 1. A protective layer 24b may be present between the core material layer 20 and the inner layer 24a. The protective layer 24b may be a foil, such as a metal foil, preferably an aluminium foil. The protective layer 24b protects against oxygen and light to maintain the nutritional value and flavours of the food product inside the package 1 at ambient temperatures.

In addition, a lamination layer 24c may be present between the protective layer 24b and the core material layer 20. The lamination layer 24c may be at least one layer of polymer material.

According to one embodiment, the inner layer 24 of the packaging material 10 intended for the inside of the finished package 1, which is in contact with the product contained in the package 1 comprises starting from the core material layer 20: a lamination layer 24c, a protective layer 24b and an sealing layer 24a. The lamination layer 24c enables the core material 20 to stick to any protective layer 24b applied. The sealing layer 24a enables package sealing.

The polymer layers 22, 24a, 24c of the packaging material 10 may be of any suitable type of polymer material, preferably a plastic material such as polyethylene.

Figure 3:
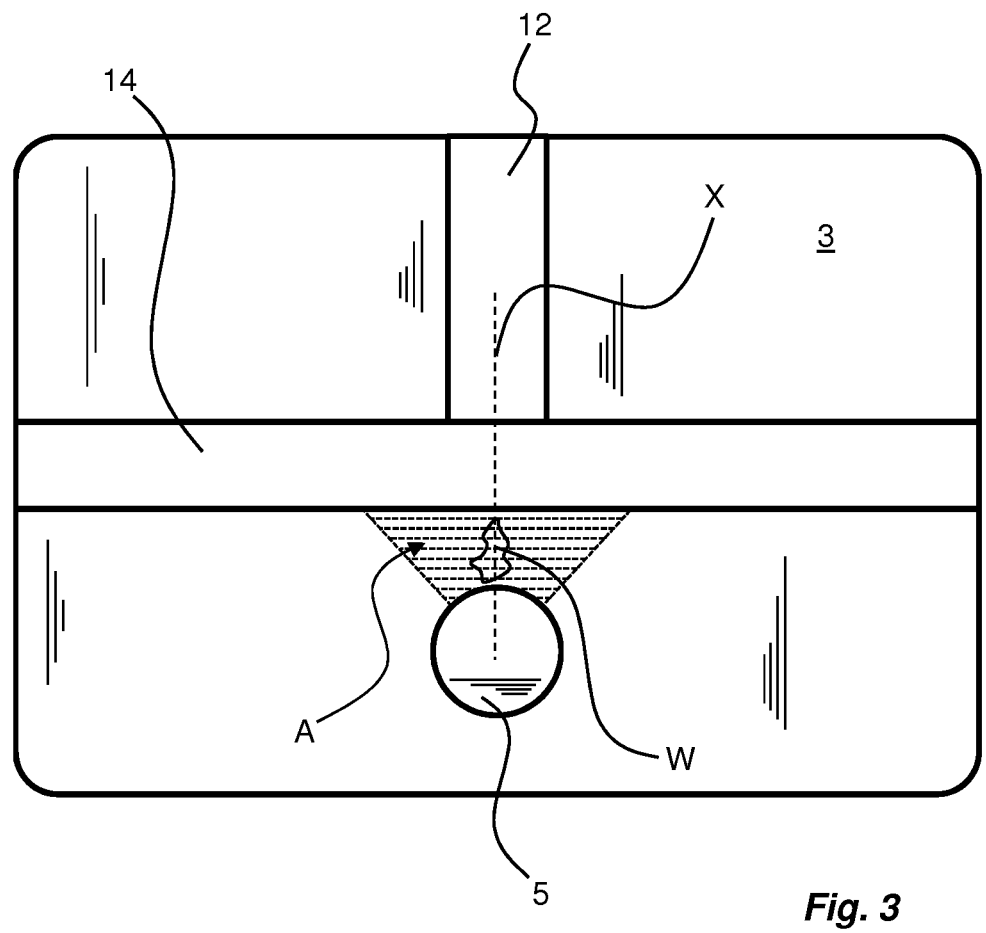
FIG. 3 is a top view of an upper end of a package.

Now turning to FIG. 3 the upper end 3 of the package 1 is shown in further detail. It should be noted that the upper end 3 of FIG. 3 is intended to represent any part of a package 1 being provided with a pre-laminated hole 5 in the packaging material 10, such that the following description is applicable also for other types of packages 1 than shown in FIG. 1. Such packages may e.g. include parallelepipedic packages like Tetra Brik®, gable-top packages like Tetra Rex®, etc.

The pre-laminated hole 5 is normally arranged somewhere between one lateral end of the upper end 3 and the transversal seal 14, which may be located centrally across the upper end 3.

During sealing and/or forming of the upper end 3 shown in FIG. 3 it is, as explained above, possible that wrinkles W occur in the packaging material 10. Tests have shown that the wrinkles, when occurring, are present in an area A extending between the edges of the pre-laminated hole 5 towards the transversal seal 14. Especially, the area A extends approximately ±60° from a virtual line X representing the shortest distance between the pre-laminated hole and the transversal seal 14, as indicated in FIG. 3. This means that essentially no wrinkles have been observed outside the area A, It has further been observed that the problem of wrinkles becomes more pronounced with an increasing diameter of the pre-laminated hole 5.

Figure 4:
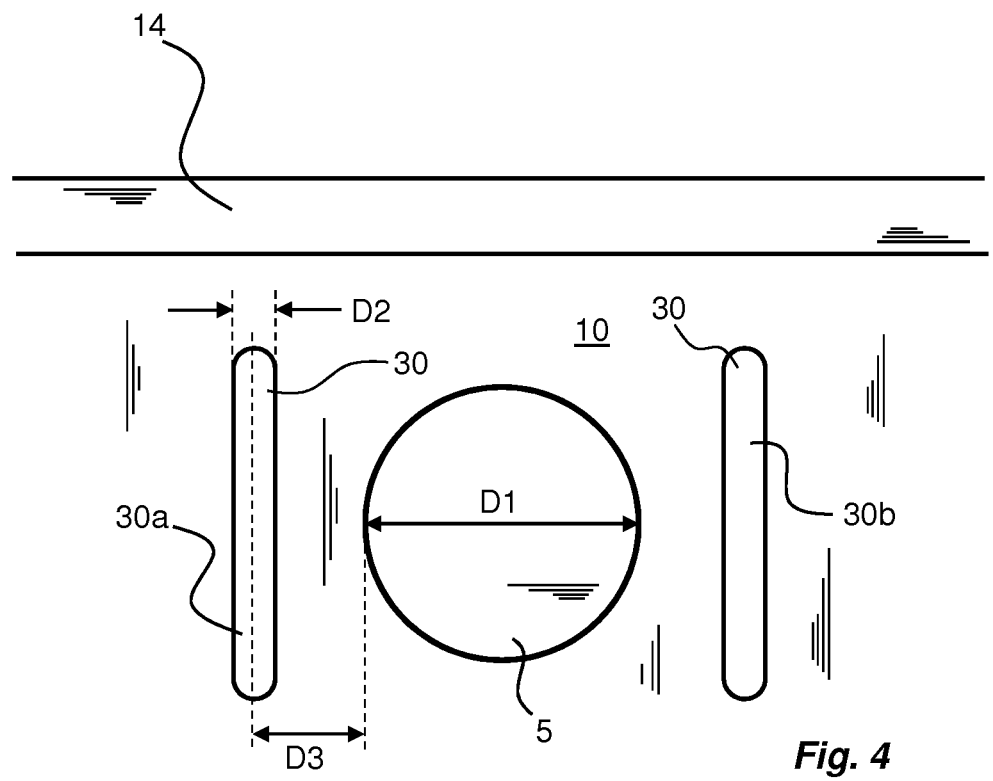
FIG. 4 is a top view of an upper end of a package according to an embodiment.

In FIG. 4 a first embodiment of a solution to avoid the formation of wrinkles is shown. The inventors have surprisingly found that by providing one or more features 30 adjacent to the pre-laminated hole 5 compression forces in the packaging material 10, occurring during sealing and/or forming of the final package 1, will be absorbed to a greater extent thus preventing the formation of wrinkles in the packaging material 10.

As can be seen in FIG. 4, such features 30 may be realized by providing two symmetrical lines 30a, 30b in the packaging material on each side of the pre-laminated hole 5. Each line 30a, 30b is effected by altering the core material layer 20 e.g. by embossing, debossing, and/or compression, and each line 30a, 30b preferably extends at least along the entire diameter D1 of the pre-laminated hole 5, in a direction towards the transversal seal 14. However, in some embodiments each line 30a, 30b may have a length which is shorter than the diameter D1 of the pre-laminated hole 5.

Especially, the lines 30a, 30b do not intersect with the transversal seal 14 but are interrupted at a distance from the transversal seal 14. Advantageously, the lines 30a, 30b are provided prior to lamination of the packaging material 10, and by having a distance between the end of each line 30a, 30b and the area of the transversal seal 14 the packaging material 10 is smooth and homogeneous at the transversal seal 14 thus improving the integrity of the seal 14.

The thickness D2 of each line 30a, 30b may be in the range of 0.5-2 mm, or slightly above that. Moreover, the shortest distance D3 between the pre-laminated hole 5 and the line 30a, 30b should preferably be above 1.5 mm, such as 3 mm. The diameter D1 of the pre-laminated hole may typically be in the range of 4-10 mm.

Figure 5A:
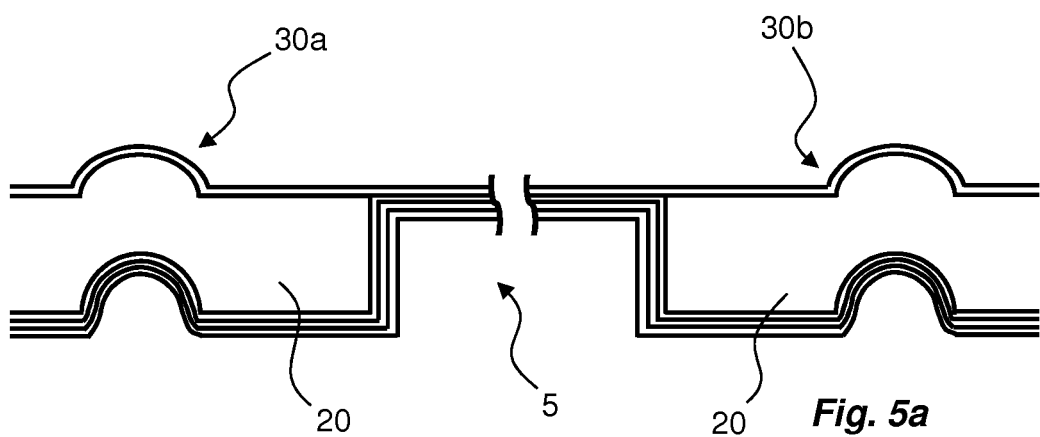
FIG. 5a is a cross-sectional view of an upper end of a package according to an embodiment.
Figure 5B:
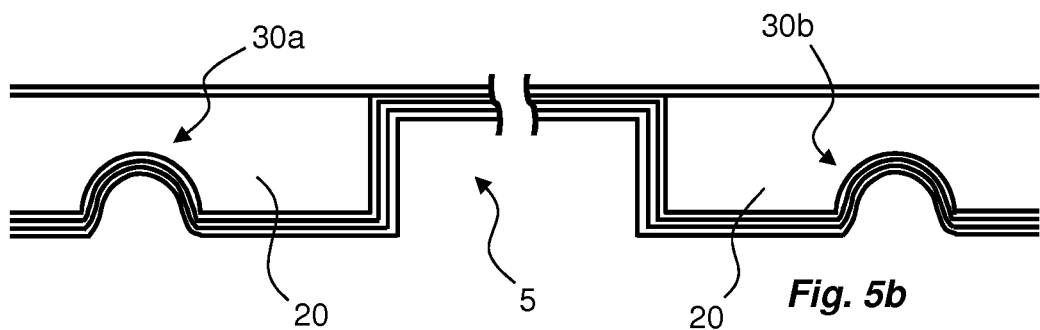
FIG. 5b is a cross-sectional view of an upper end of a package according to an embodiment.

The method of providing the features 30 may be made in different ways, as illustrated in FIGS. 5a and 5b. As is shown in FIG. 5a the core material layer 20 may be processed such that its otherwise planar shape is altered into a relief pattern corresponding to the shape of the lines 30a, 30b. This may be achieved either by embossing or debossing, depending on the final design of the package 1. For embossing the outside of the packaging material 10 is raised (as is shown in FIG. 5a), while debossing provides a sunken pattern at the outside of the packaging material 10.

In FIG. 5b the features 30 are formed by compressing the core material layer 20, however using a planar anvil thus preventing the pattern to protrude on the outside.

In any of the above-described examples, the core material layer 20 will to some extent be compressed at the area of the feature(s) 30. For the example of FIG. 5b the entire feature will be a compressed pattern. Although the feature 30 of FIG. 5a will form a deflection from the originally flat shape on both sides of the core material layer, a compression of the core material layer will in fact be present as the shape of the outer side will not be identical to the shape of the inner side.

Normally the packaging material 10 is provided with a series of crease lines for defining the folding lines used during forming and sealing of the package 1. Advantageously the features 30 may therefore be provided in the same creasing process, thus removing the need for separate process steps.

Other examples of features 30 which have been verified to reduce the problem of wrinkles at the area around the pre-laminated hole 5 are shown in FIGS. 6a-f. Each feature 30 discussed in the following will provide a compression in the core material layer and may either be formed as an indentation (i.e. a purely compressed feature) on the inner or outer side, an indentation on the inner side and a boss on the outer side (i.e. an embossed feature), or a boss on the inner side and an indentation on the outer side (i.e. a debossed feature). The thickness of each feature 30 is essentially similar to the thickness D2 described with reference to FIG. 4.

Figure 6A:
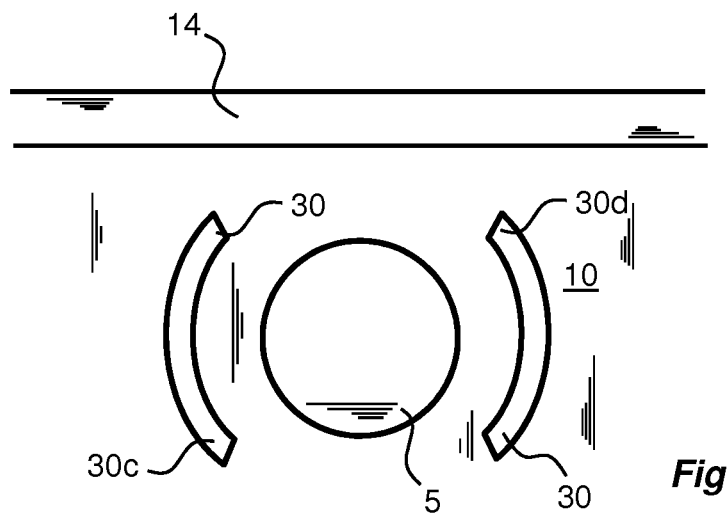
FIGS. 6a-f are top views of an upper end of a package according to various embodiments.

Starting in FIG. 6a, the packaging material 10 is provided with two features 30 in the vicinity of the pre-laminated hole 5. Each feature 30 is formed as a curved line 30c, 30d surrounding and tracing a part of the periphery of the pre-laminated hole. The curvature of each line 30c-d is preferably designed such that the distance between the line 30c-d and the perimeter of the pre-laminated hole 5 is constant. Each line 30c-d may extend in the range of 30-150°, and the lines 30c-d are preferably separated from each other at both ends.

Figure 6B:
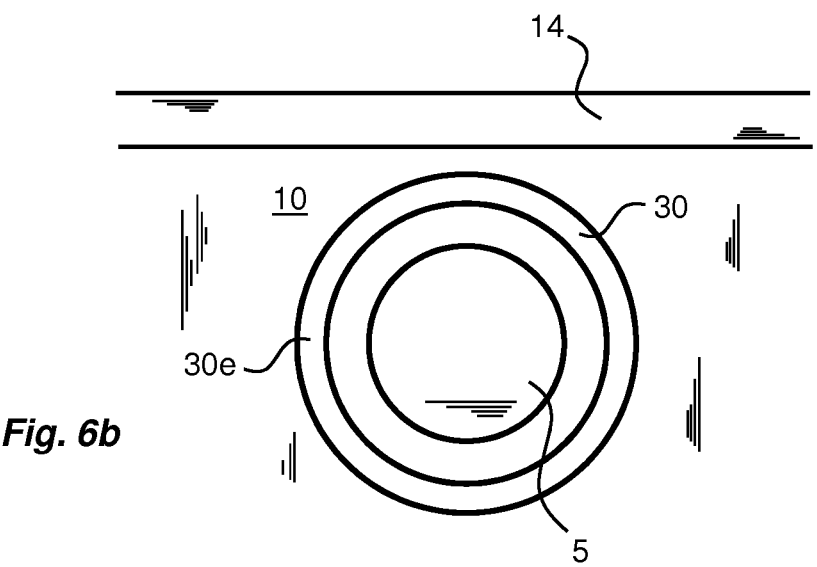

In FIG. 6b another example is shown. Here only one feature 30 forms a circular line 30e surrounding the pre-laminated hole 5. The radial distance between the feature 30e and the pre-laminated hole 5 is preferably selected such that the circular line 30e does not intersect with the transversal seal 14.

Figure 6C:
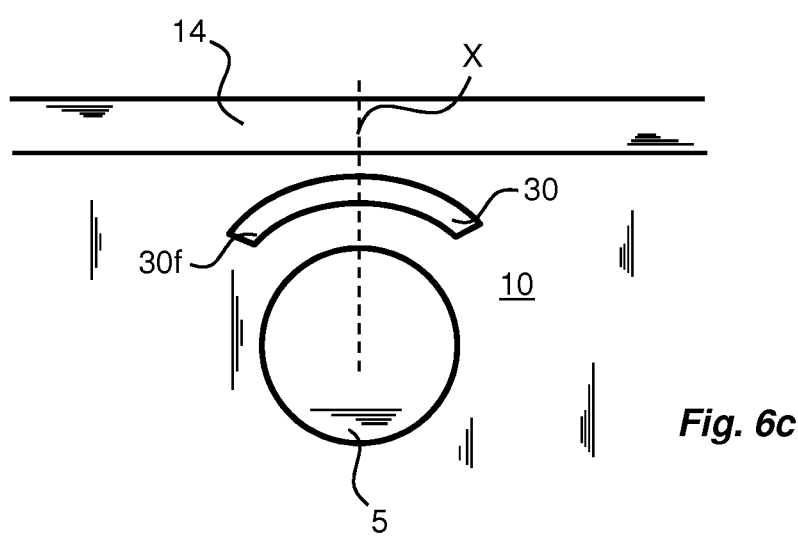

In FIG. 6c the feature 30 is provided as a semi-circular, or curved, line 30f arranged in the area between the pre-laminated hole 5 and the transversal seal 14. The line 30f may extend in the range of 30-150°, preferably symmetrically around line X.

Figure 6D:
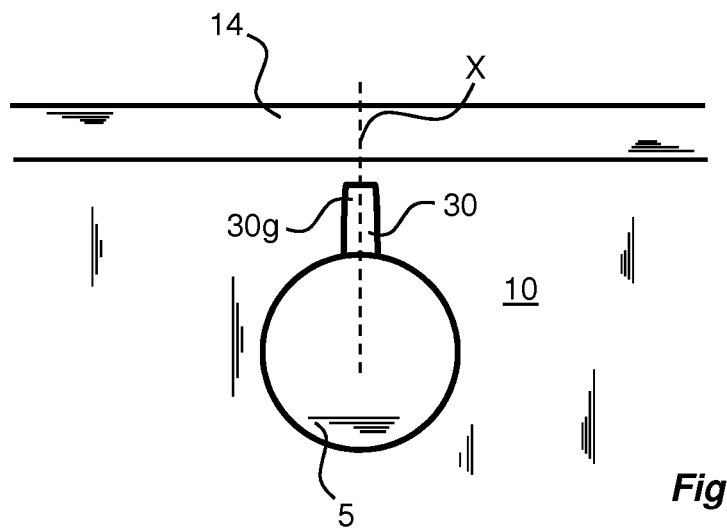

In FIG. 6d another embodiment is shown, wherein the feature 30 is formed as a straight line 30g extending from the pre-laminated hole 5 towards the transversal seal 14. Preferably, the line 30g coincides with the vertical line X. As explained above the line 30g should be interrupted at a small distance from the transversal seal 14.

Figure 6E:
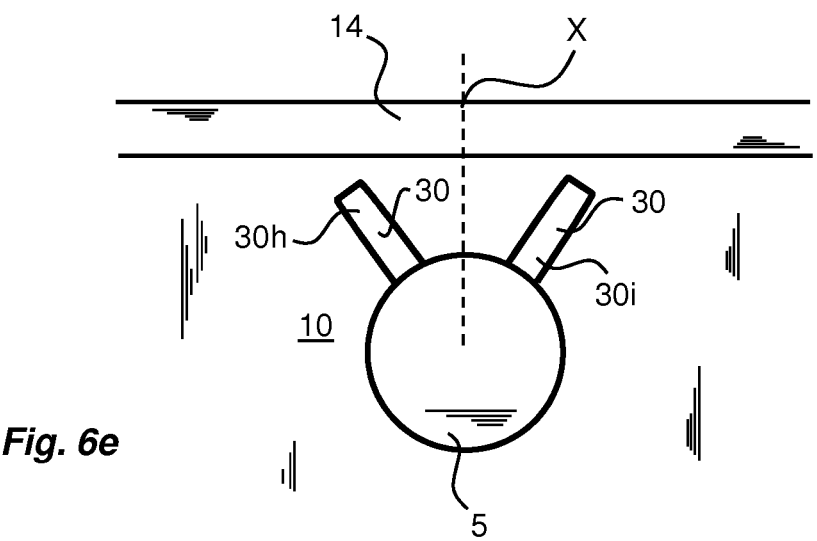

Another example is shown in FIG. 6e. The features 30 are here provided as two spaced apart lines 30h-i, extending at an angle relative each other. The lines 30h-i are symmetrically arranged relative the virtual line X, and they may be arranged to cover an angular distance of approximately ±60° relative the virtual line X. As for the line 30g shown in FIG. 6d, the lines 30h-i are interrupted such that they do not intersect the transversal seal 14.

Figure 6F:
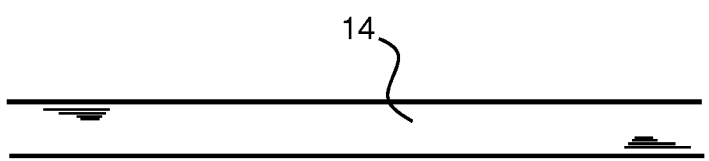

In FIG. 6f the feature 30 is formed as a circular line 30j surrounding the pre-laminated hole 5. Compared to the feature 30e shown in FIG. 6b the circular line 30j is arranged immediately adjacent to the pre-laminated hole. The circular line 30j is associated with a number of advantages. For example, it is possible to ensure perfect centering of the line 30j by using the punching device to form the feature 30. Moreover, lamination of the packaging material over the punched hole will be easier since the thickness of the core material layer 20 will be reduced, especially if the feature 30j is formed by compression.

Figure 7A:
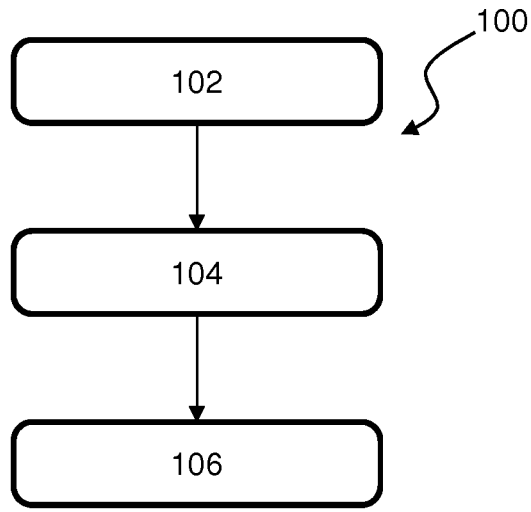
FIGS. 7a-c are schematic views of a method for providing a packaging material according to various embodiments.

Now turning to FIGS. 7a-c methods 100 will be described, whereby the method 100 is performed in order to provide a packaging material 10 as described above. According to FIG. 7a the method 100 is performed by a first step 102 in which a core material layer 20 is provided with at least one hole. In a subsequent step 104 the core material layer 20 is laminated in order to form a laminated packaging material 10 with a pre-laminated hole 5. The method 100 further comprises a step 106 in which at least one compressed feature 30 is arranged adjacent to the pre-laminated hole 5.

Figure 7B:
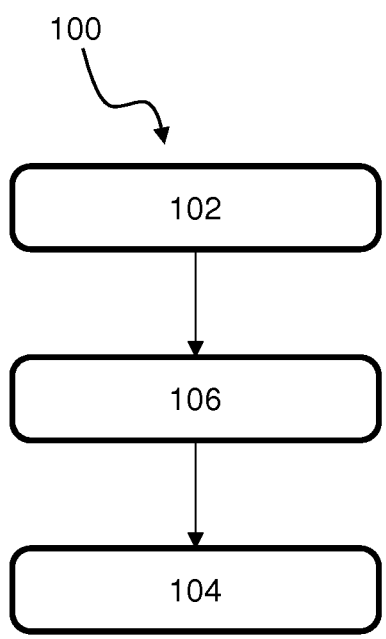

The compressed feature 30 may be provided prior to lamination of the core material layer 20, as indicated in FIG. 7b.

Figure 7C:
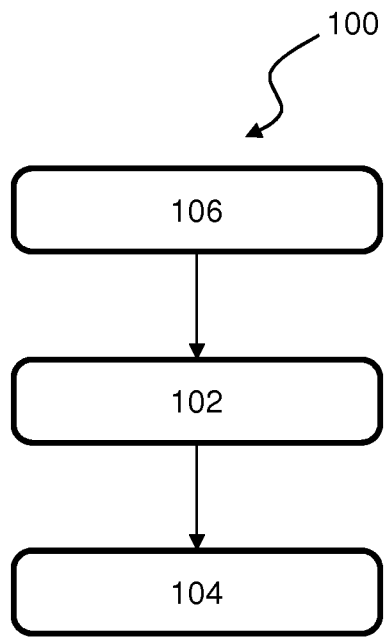

In an even more preferred method 100, shown in FIG. 7c, the step 106 of providing the compressed feature(s) is performed prior to the step 102 of providing the at least one hole, and the step 104 of laminating the core material layer 20.

From the description above follows that, although various embodiments of the invention have been described and shown, the invention is not restricted thereto, but may also be embodied in other ways within the scope of the subject-matter defined in the following claims.

The invention claimed is:

1. A packaging material, comprising:
 a laminate with a core material layer, an outer layer, and an inner layer and having a plurality of delimited areas configured to form faces of a package, wherein at least one delimited area is provided with at least one pre-laminated hole and a plurality of compressed features arranged adjacent and spaced apart from the at least one pre-laminated hole, the pre-laminated hole comprising the outer layer and the inner layer, and wherein each compressed feature comprises a length, the length equal to or greater than a diameter of the at least one pre-laminated hole.

2. The packaging material according to claim 1, wherein the at least one delimited area is configured to form an upper end of the package.

3. The packaging material according to claim 1, wherein the at least one pre-laminated hold is configured to form a straw hole of the package.

4. The packaging material according to claim 1, wherein at least one of the plurality of compressed features is arranged within 10 mm from the pre-laminated hole.

5. The packaging material according to claim 1, wherein the plurality of compressed features is formed by embossing, debossing, or compression.

6. The packaging material according to claim 5, wherein at least one of the plurality of compressed features is curved.

7. The packaging material according to claim 6, wherein two of the plurality of compressed features are curved and positioned on opposite sides of the at least one pre-laminated hole.

8. The packaging material according to claim 7, wherein each curved compressed feature extends between 30° and 150° of a periphery of the at least one pre-laminated hole.

9. A package, comprising a packaging material according to claim 1, wherein the packaging material is closed by seals to form a closed package.

10. A method for providing a packaging material, comprising:
 providing a core material layer with at least one hole;
 laminating the core material layer to form a laminated packaging material with a pre-laminated hole, the pre-laminated hole comprising an outer layer and an inner layer; and
 providing a plurality of compressed features adjacent and spaced apart from the pre-laminated hole prior to or after providing the core material layer with at least one hole, wherein each compressed feature comprises a length, the length equal to or greater than a diameter of the pre-laminated hole.

11. The packaging material according to claim 1, wherein the at least one delimited area comprises an edge defining a boundary of the delimited area, and wherein at least one of the plurality of compressed feature is spaced apart from the edge of the delimited area.

12. The packaging material according to claim 1, wherein at least one of the plurality of compressed feature has a thickness between 0.5 mm to 2 mm.

13. The method for providing a packaging material according to claim 10, wherein the pre-laminated hole is formed on a delimited area of the laminated packaging material, the delimited area comprising an edge defining a boundary of the delimited area, and wherein at least one of the plurality of compressed features is spaced apart from the edge of the delimited area.

14. The method for providing a packaging material according to claim 10, wherein at least one of the plurality of compressed features has a thickness between 0.5 mm to 2 mm.

15. The packaging material of claim 1, wherein the packaging material comprises two compressed features, the two compressed features positioned on opposite sides of the at least one pre-laminated hole.

16. The packaging material of claim 1, wherein at least one of the plurality of compressed features is thinner than the pre-laminated hole.

17. The packaging material of claim 1, wherein at least one of the plurality of compressed features comprises an upward deflection on a bottom side of the compressed feature and a flat surface on the top side of the compressed feature.

* * * * *

UNITED STATES PATENT AND TRADEMARK OFFICE
CERTIFICATE OF CORRECTION

| | |
|---|---|
| PATENT NO. | : 11,198,533 B2 |
| APPLICATION NO. | : 16/484795 |
| DATED | : December 14, 2021 |
| INVENTOR(S) | : Benko et al. |

It is certified that error appears in the above-identified patent and that said Letters Patent is hereby corrected as shown below:

In the Specification

In Column 4, Line 60, delete "A, It" and insert --A. It--.

In the Claims

In Column 7, Claim 3, Line 21, delete "hold" and insert --hole--.

Signed and Sealed this
Nineteenth Day of April, 2022

Katherine Kelly Vidal
*Director of the United States Patent and Trademark Office*